H. S. WOODRUFF.

Buckles.

No. 8,541. Reissued Jan. 14, 1879.

Witnesses:

Edl. H. Bonfinster

S. Henry Nudson

Inventor:

Henry S. Woodruff.

N. PETERS, PHOTO-LITHOGRAPHER, WASHINGTON, D. C.

UNITED STATES PATENT OFFICE.

HENRY S. WOODRUFF, OF JANESVILLE, WISCONSIN.

IMPROVEMENT IN BUCKLES.

Specification forming part of Letters Patent No. 122,545, dated January 9, 1872; Reissue No. 8,541, dated January 14, 1879; application filed October 17, 1878.

*To all whom it may concern:*

Be it known that I, HENRY S. WOODRUFF, of the city of Janesville, in the county of Rock and State of Wisconsin, have invented certain Improvements in Buckles, of which the following is a specification:

My invention relates to buckles; and the object of it is to relieve a trace strap or belt from the strain at the point where it is perforated for a buckle-tongue.

Figure 1:
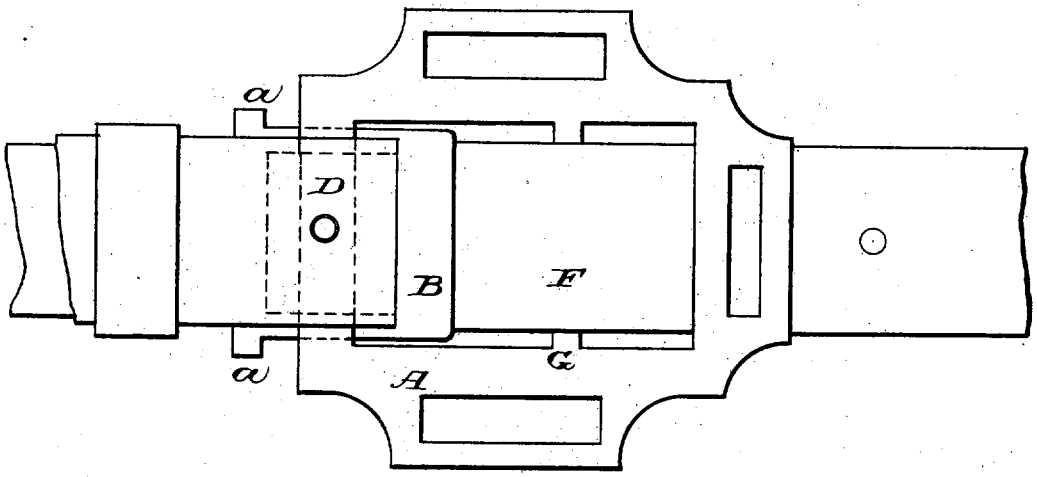
Figure 2:
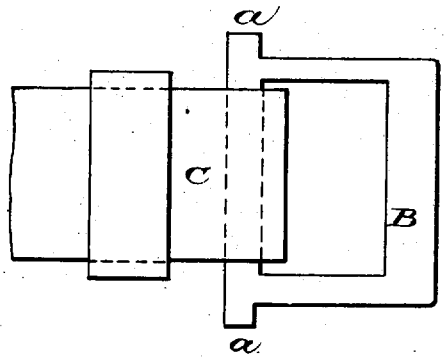
Figure 3:
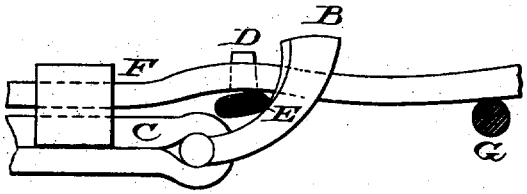

Figure 1 is a view of my buckle-frame with the hame-tug and trace attached. Fig. 2 shows the draft-loop with a hame-tug attached; Fig. 3, the same as Figs. 1 and 2, at right angles with those figures, also representing a trace passing through the loop, the side of the frame being broken away, showing the end of bars E and G.

The same letters in each figure represent the same part.

My invention consists of a buckle with a frame, A, and in connection therewith of a loose draft-loop, B, bearing directly down upon the trace and passing freely through the frame A, to which the hame-tug C is attached. The forward end of loop B, to which the hame-tug is attached, has lateral projections or trunnions *a a*, to guard the loop from slipping through frame A in changing the trace; also, a rigid tongue, D, located on the outer face of forward end bar E of the frame A, arranged and combined in such a manner that the trace F passes through frame A, loop B, and over tongue D; and when the draft is applied to hame-tug C in one direction, and to trace F in the other, the loop is drawn downward and forward in such a manner that the trace is held firmly by the loop pressing it against forward end bar E and cross-bar G of the frame, and depressed by the rear end bar of frame A, forming in the tug four distinct curves, and having four distinct bearings; and the greater the strain applied the more firmly the trace is held to the frame, thereby relieving the strain upon the trace at the tongue D.

I do not confine myself in the use of this buckle to harness-work; but it may be used for other purposes, especially for connecting belting, it having the elasticity and form to pass over pulleys to advantage, and transfers the usual damaging strain to a portion of the strap not weakened by being punctured.

I am aware that a loop has been used running through and guided by grooves in the side bar of the frame as in the patent issued to J. A. Mashmeyer, dated September 10, 1867, and having a rigid tongue attached to the under side of the loop, and I do not claim a loop running in grooves or having a tongue attached thereto. Also, I am aware that a loop has been used that bears upon a plate, the plate having a tongue on its under side, as in the patent issued to Worster. (Date of patent I cannot give.) I do not claim a loop except it presses directly upon the trace-strap or belt. Also, in the patent issued to H. S. Woodruff February 12, 1867, a buckle-frame is described having a fixed tongue on the middle bar of the frame, the tongue taking the strain or draft of the trace. I do not herein claim a rigid tongue, only as it is located on the forward end bar of the frame, and combined with a loose loop and frame, the tongue serving chiefly to hold the trace in place, while the action of the loop and bars of the frame engage and hold fast the trace.

What I do claim as my invention, and desire to secure by Letters Patent, is—

1. In a buckle, a loose draft-loop provided with lateral extensions to prevent it slipping out of the frame, all substantially as and for the purposes set forth.

2. A buckle-frame provided with a loose loop, as shown, and having a rigid tongue on the outer face of its forward cross-bar, all substantially as shown and described.

3. In a buckle, the combination of the frame A, having a rigid tongue projecting outward, with the loose loop B, all substantially as shown and described.

4. The combination of the loose loop B with frame A and tongue D, when the whole is constructed as described, and for the purposes hereinbefore set forth.

HENRY S. WOODRUFF.

Witnesses:

ED. F. CARPENTER,
S. HENRY HUDSON.